(12) United States Patent
Salsbury et al.

(10) Patent No.: US 10,816,408 B1
(45) Date of Patent: *Oct. 27, 2020

(54) WAVELENGTH SHIFTING IN SPECTRALLY-CONTROLLED INTERFEROMETRY

(71) Applicant: APRE INSTRUMENTS, LLC, Tucson, AZ (US)

(72) Inventors: Chase Salsbury, Tucson, AZ (US); Artur Olszak, Tucson, AZ (US)

(73) Assignee: APRE INSTRUMENTS, LLC., Tucson, AZ (US)

( * ) Notice: Subject to any disclaimer, the term of this patent is extended or adjusted under 35 U.S.C. 154(b) by 99 days.

This patent is subject to a terminal disclaimer.

(21) Appl. No.: 15/959,006

(22) Filed: Apr. 20, 2018

Related U.S. Application Data

(60) Provisional application No. 62/489,008, filed on Apr. 24, 2017, provisional application No. 62/490,029, filed on Apr. 26, 2017.

(51) Int. Cl.
*G01J 9/02* (2006.01)
*G01B 9/02* (2006.01)

(52) U.S. Cl.
CPC ............ *G01J 9/02* (2013.01); *G01B 9/02004* (2013.01); *G01B 9/02007* (2013.01); *G01B 9/0209* (2013.01); *G01J 2009/0253* (2013.01)

(58) Field of Classification Search
CPC .. G01J 9/02; G01J 2009/0253; G01B 9/0209; G01B 9/02004
See application file for complete search history.

(56) References Cited

U.S. PATENT DOCUMENTS

| | | | |
|---|---|---|---|
| 8,422,026 B2 | 4/2013 | Olszak | |
| 8,675,205 B2 | 3/2014 | Olszak | |
| 8,810,884 B1 | 8/2014 | Olszak | |
| 8,922,784 B2* | 12/2014 | Yamada | ............... A61B 5/0062 356/497 |
| 9,581,428 B2 | 2/2017 | Olszak | |
| 9,581,437 B2 | 2/2017 | Smythe et al. | |
| 9,593,934 B2* | 3/2017 | Goldberg | ........... G01N 21/4795 |
| 9,618,320 B2 | 4/2017 | Olszak | |
| 9,696,211 B2 | 7/2017 | Olszak | |

* cited by examiner

*Primary Examiner* — Hwa Andrew Lee
(74) *Attorney, Agent, or Firm* — Antonio R. Durando

(57) ABSTRACT

A light source capable of spectral modulation is modulated conventionally to produce a correlogram at the test surface position of an SCI interferometer. The mean wavelength of the light source is changed to obtain multiple corresponding phase-shifted correlograms that can be processed by applying conventional multiple-wavelength interferometric analysis to determine physical attributes of the test surface. One simple way to achieve this result is by splitting the light beam produced by the source into at least three simultaneous beams passed through filters with corresponding different mean-wavelength transmission bands. Because the correlograms are produced simultaneously, they can be used to practice instantaneous phase-shifting interferometry using conventional analysis algorithms.

18 Claims, 5 Drawing Sheets

---

MODULATING A SPECTRALLY-CONTROLLABLE LIGHT SOURCE SO AS TO PRODUCE A CORRELOGRAM AT A TEST SURFACE POSITION

↓

CHANGING THE MEAN WAVELENGTH OF THE LIGHT SOURCE SO AS TO PRODUCE MULTIPLE CORRELOGRAMS AT THE TEST SURFACE POSITION

↓

PROCESSING SUCH MULTIPLE CORRELOGRAMS TO DETERMINE A PHYSICAL ATTRIBUTE OF THE TEST SURFACE

MODULATING A SPECTRALLY-CONTROLLABLE LIGHT SOURCE SO AS TO PRODUCE A CORRELOGRAM AT A TEST SURFACE POSITION

CHANGING THE MEAN WAVELENGTH OF THE LIGHT SOURCE SO AS TO PRODUCE MULTIPLE CORRELOGRAMS AT THE TEST SURFACE POSITION

PROCESSING SUCH MULTIPLE CORRELOGRAMS TO DETERMINE A PHYSICAL ATTRIBUTE OF THE TEST SURFACE

WAVELENGTH SHIFTING IN SPECTRALLY-CONTROLLED INTERFEROMETRY

RELATED APPLICATIONS

This application is based on and claims the priority of U.S. Provisional Application Ser. No. 62/489,008, filed Apr. 24, 2017, and of U.S. Provisional Application Ser. No. 62/490,029, filed Apr. 26, 2017, both hereby incorporated by reference.

BACKGROUND OF THE INVENTION

Field of the Invention

The invention relates generally to interferometry. In particular, it relates to a new method for practicing spectrally-controlled interferometry based on changing the mean wavelength of the source.

Description of the Related Art

As described in numerous co-owned publications (see U.S. Pat. Nos. 8,422,026, 8,810,884 and 8,675,205, for example), spectrally controlled interferometry (SCI) is an interferometric technique that allows the implementation of conventional white light interferometry (WLI) measurement schemes in common path interferometers. WLI (also defined by convention as coherence scanning interferometry, CSI) is characterized by the absence of spurious interference problems (coherent noise) present in conventional laser interferometry because of the light's short coherence length, typically on the order of a few micrometers.

Though subject to coherent noise, conventional laser interferometry (generally referred to as phase-shifting interferometry or PSI) is extremely popular because it allows the use of common-path interferometer designs—a particular class of devices in which most of the errors introduced by the optical system cancel out, thus allowing the use of less expensive and more accurate instruments. The most commonly used design is Fizeau interferometer.

WLI is immune to coherent noise but requires careful balancing of the optical path difference (OPD) of the instrument so interference can take place in the measurement space (localized interference). Such arrangements can be complex to manufacture and preclude the use of common-path interferometers, therefore forfeiting its advantages.

SCI successfully combines the advantages of both common-path interferometry and WLI. It produces localized interference fringes in an unbalanced-OPD interferometer, thereby allowing the use of a Fizeau type of interferometer in WLI mode, thus eliminating the problem of coherent noise. As a further major advantage of SCI, existing instrumentation can be adapted to its modality of operation simply by replacing the laser light source with one capable of proper spectral modulation. As detailed in previous disclosures and further herein, many different interferometric techniques of analysis can be implemented by manipulating only the spectral properties of such light source according to SCI principles.

In essence, spectrally-controlled interferometry is based on the idea of forming localized fringes at a predefined distance from the reference surface using an interferometer under unbalanced OPD conditions. For example, by modulating the spectrum of the light source, it is possible to form such localized fringes and, by changing the modality of modulation, it is also possible to phase shift the fringes, which permits the use of modern fringe analysis methods to measure the test article without any physical scanning of the object or reference surface. As such, in addition to practicing interferometry in WLI and conventional laser-interferometry modes with the described advantages, SCI also allows the measurement of isolated surfaces and enables the direct measurement of distance from the interferometer's reference surface.

In some cases it may be desirable to obtain the advantages of SCI measurements by producing multiple fringe patterns without changing the modality of modulation of the spectral properties of the illumination source as heretofore described in preceding disclosures related to SCI. For example, it may be desirable to obtain multiple SCI correlograms without changing the period or the phase of modulation that produced the localized fringes. This would be the case, for instance, when acquiring multiple correlograms simultaneously, such as for instantaneous phase-measurement systems. This invention presents an alternative method of SCI practice that relies on changing only the mean wavelength of the light to achieve phase shifting of the resulting fringes with the same advantages discussed above.

SUMMARY OF THE INVENTION

The invention lies in the recognition that a change in the mean wavelength of the light produced by a spectrally controllable source, without further changes in the modality of modulation used to produce localized fringes, results in a change in the phase of the source's output that can be exploited advantageously to practice spectrally controlled interferometry. Thus, according to one aspect of the invention, a light source capable of spectral modulation is modulated conventionally to produce a correlogram at the test surface position of an SCI interferometer. The mean wavelength of the light source is then changed to obtain multiple corresponding correlograms that can be processed to determine a physical attribute of the test surface.

According to another aspect of the invention, the light source is adapted to produce multiple beams having different mean wavelengths to produce corresponding multiple simultaneous phase-shifted correlograms and the processing step is carried out by applying conventional multiple-wavelength interferometric analysis to such correlograms. One simple way to achieve this result is by splitting the light beam produced by the source into at least three simultaneous beams passed through filters with corresponding mean-wavelength transmission bands. Because at least three correlograms are produced simultaneously, they can be used to practice instantaneous phase-shifting interferometry using conventional analysis algorithms.

According to still another aspect of the invention, the step of producing three simultaneous phase-shifted correlograms is repeated at different distances from the test surface position, the correlograms obtained at each step are processed with instantaneous phase-shifting interferometric analysis, and the correlograms obtained from the different distances are processed using conventional coherence scanning interferometric analysis.

Various other advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment, and particularly pointed out in the claims. However, such drawings and description disclose but a few of the various ways in which the invention may be practiced.

DETAILED DESCRIPTION OF THE INVENTION

Figure 1:
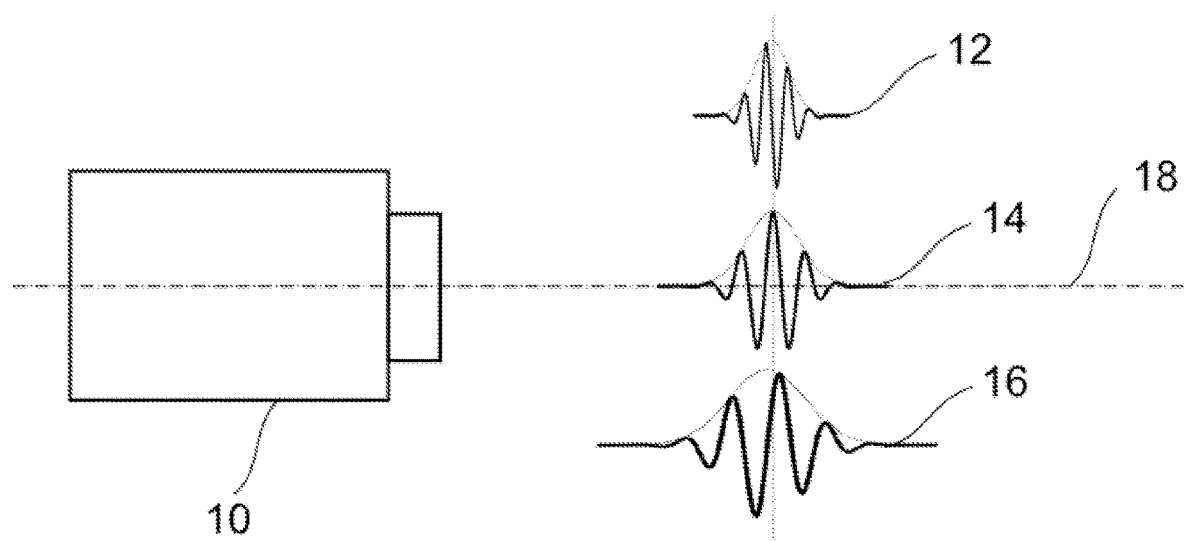
FIG. 1 illustrates schematically three localized fringe envelopes shifted in space by varying the mean wavelength according to the invention for analysis with CSI techniques to determine the position of maximum contrast of the test object along the optical axis of the interferometer.

As used in this disclosure, "white light" is intended to refer to any broadband light of the type used in the art of white-light interferometry (WLI), typically having a bandwidth in the order of many nanometers. The terms WLI and CSI (coherence scanning interferometry) are used interchangeably. With reference to light in general, the terms "frequency" and "wavelength" are used alternatively, as commonly done in the art, because of their well-known inverse relationship. "Optical path difference" or "OPD" and "time delay" may be used alternatively because of their space/time relationship in interferometry. As normally done in the art with reference to interferometric apparatus, "optical path difference" and "OPD" are also used to refer to the difference between the lengths of the optical paths of the test and reference arms of the apparatus. The terms "sine" and "cosine," as well as related terms, are used alternatively unless specifically indicated otherwise. The terms "reference surface," "reference optic" and "reference sphere" may all be used alternatively to refer to an interferometer's element defining the optical path length of the reference arm. Similarly, the terms "test surface," "measured surface," "test article," "test object" and "test lens" may all be used to refer to the object that is the subject of a measurement. In relation to a test surface, the terms "physical attributes" mean structural parameters, such as three-dimensional information, as well as position in space relative to the reference surface. The term "simultaneous" and related terminology are used to refer to the temporal acquisition of fringe signals for the purposes of the measurement (as opposed to sequential fringe signals that, according to SCI principles, can also be acquired advantageously over time by modulating the source without scanning the test object). The term "multiplexed" is used to refer to a correlogram obtained by detecting a plurality of different frequencies and corresponding interference signals during sequential fractions of the integration time of the detector, so as to form and record during each integration time a multiplexed correlogram pattern corresponding to the superposition of the signals so acquired.

The terms "modulate" and "modulation" are used in connection with a light source in the broadest sense to include any alteration of the frequency distribution, amplitude distribution or phase distribution of energy produced by the light source, and to also include the synthesis by any means of a light signal having a desired frequency, amplitude or phase distribution. When used in connection with interference fringes, the term "modulation" refers to the fringe envelope. In the case of spectrally-controlled or multiple-wavelength sources, "localized fringes" is intended to mean unambiguously identifiable fringe patterns formed at predetermined distances from the reference surface. Localized fringes are described as positioned at the surfaces from which they are produced to illustrate how they relate to those surfaces and surface shapes that produce them; however, it is understood that physically such localized fringes are only virtual fringes and that actual fringes are in fact formed only at the surface of the detector. Also, the phrase "producing localized fringes at a predetermined position in space" and related expressions are used for convenience, but it is understood that the precise intended meaning is "producing an interferometric environment whereby unambiguously identifiable fringe patterns are produced when a test surface is placed at a predetermined position in space" relative to a reference surface. The terms "fringes," "fringe patterns," "interference fringes" and correlograms are used interchangeably within the meaning normally accorded to them in the art. Finally, the generic term "interferometry" and related terms should be construed broadly as used in the art and not limited to shape measurements using an imaging interferometer. As such, interferometry is intended to include, without limitation, the measurement of changes in the position of an object, or of thickness of optical elements, using any known interferometric technique. Finally, the term "spectrally controllable light source" is intended to mean any light source capable of spectral modulation, whether the source is a single-component spectrally controllable source, such as currently available lasers capable of spectral modulation, or a multi-component source, such as a source that includes a broadband source and a modulator as separate components.

The distribution and phase of the fringes produced by an interferometer is governed by the Wiener-Kinchin Theorem (see Born M, Wolf E., *Principles of optics: electromagnetic theory of propagation, interference and diffraction of light*, 7th Expand Ed., Cambridge, New York: Cambridge University Press; 1999) and is expressed as the Fourier Transform of the spectral power distribution of the source. SCI teaches that it is possible to define the location and distribution of the interference fringes in space through modulation of the source's spectrum. For a source with mean wavelength $\lambda_0$, Equation 1 below expresses the distance of the location L of fringe formation (i.e., the peak of fringe contrast) from the reference surface as a function of the period of spectral modulation $\Delta\lambda$, $$L = \frac{\lambda_0^2}{2\Delta\lambda} \quad (1)$$

For example, to form fringes at the distance of 1 meter from the reference surface with a light source operating at a mean wavelength of 500 nm, the period of modulation needs to be 0.125 pm. This property is the basis for the practice of SCI together with any technique used in the art for analyzing fringes, such as scanning white-light and phase-shifting interferometric algorithms.

In most cases it is convenient to modulate the spectrum using a sine function, which produces a single location in the measurement space where fringes are visible (the other locations being at the conjugate location outside the measurement space and at the reference surface's zero OPD). In such case the phase of the fringes is tied to the phase of the modulating signal. However, we discovered that an alternative way to change some of the properties of the interference pattern is through changes in the mean wavelength of the light source. As detailed below, this also provides a convenient way to form overlapping interference fringe patterns or families with different periods in the same optical system, which in turn can be used to provide exact distance information as well as to implement instantaneous phase-shifting measurements.

Equation 2 below describes the interference pattern resulting from the sinusoidal modulation of the source spectrum, $$I(z, \lambda, \varphi) = 0.5 \left[ 1 + \cos\left(\frac{2\pi z}{\lambda_0} + \varphi\right) \right] \exp\left( -\frac{\left(\Lambda\left(z - \frac{\lambda_0^2}{2\Delta\lambda}\right)\right)^2}{\pi \lambda_0^2} \right) \quad (2)$$

where $\lambda_0$ is wavelength, z is the distance from the zero OPD point (in relation to the reference surface), $\Lambda$ is the total bandwidth of the source, and $\varphi$ is the phase of the spectral modulation. Thus, given a source with fixed, know bandwidth and mean wavelength, it is possible to determine the location of the test surface with respect to the reference surface by determining the wavelength modulation period required to produce fringes of the highest contrast. However, these equations also show that both the location L of the peak of fringe contrast and the period of the interference pattern depend not only on the period of the spectral modulation $\Delta\lambda$ but also on the mean wavelength $\lambda_0$ of the source. This realization opened the field of application of SCI beyond the realm of spectral modulation heretofore considered in the art. Indeed, under certain conditions it is also possible to affect both the phase and the location of the localized fringes simply by changing the mean wavelength of the source.

Based on this realization, the most fundamental SCI application available from changes in the mean wavelength of the source is the ability to introduce a phase shift in the interference pattern. In particular, we found that a slight change in the mean wavelength of the source from $\lambda_0$ to $\lambda_1$ (that is, under conditions such that $\lambda_0 \approx \lambda_1$) will result in a corresponding phase change given by $$\Delta\varphi = \frac{2\pi z \delta\lambda}{\lambda_0^2}, \quad (3)$$

where $\delta\lambda = \lambda_0 - \lambda_1$, and z is the optical distance of the test surface from the reference surface (z being arbitrarily chosen as the direction of propagation perpendicular to the reference surface within an x,y,z coordinate system originating at zero OPD). Such small change in mean frequency will also introduce a very small shift in the location of maximum contrast, but those skilled in the art will recognize that in most cases this shift can be neglected because useful phase shifts for PSI measurements can be obtained within the acceptable range of peak position produced by the required changes in mean wavelength of the source. Hence, control of the mean wavelength of the source provides an effective means for introducing the phase shift required for automated fringe pattern analysis according to conventional PSI. The required change of mean wavelength to produce the desired phase shift is easily determined from Equation 3. For example, a phase shift of pi/2 for fringes at 100 mm at a mean wavelength of 633 nm requires a change of mean wavelength of about 10 pm.

Accordingly, a useful application of the invention lies in the use of mean-wavelength control to provide resolution in the z direction by observing fringe patterns formed by SCI using different parts of the spectrum of the source, each with a different mean wavelength. For example, as illustrated in FIG. 1, an SCI source 10 can be used to produce three localized fringe patterns (correlograms) 12,14,16 along the optical axis 18 of the interferometer, each correlogram resulting from modulating the source with a different mean wavelength. As taught above, each mean wavelength will produce a fringe pattern having a different period, which can therefore be analyzed using conventional multiple-wavelength interferometry methods to find the common exact peak of modulation.

Figure 2:
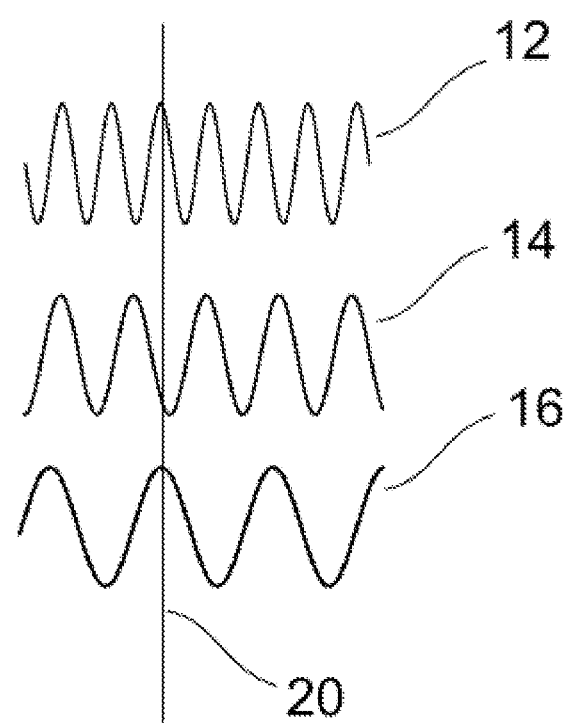
FIG. 2 illustrates the differences in the fringe period of each of the fringe envelopes of FIG. 1 as a result of the different mean wavelengths used to produce them.

FIG. 2 illustrates in magnified detail the differences in the fringe periods of correlograms 12,14,16 of FIG. 1 showing the relative position of the test surface represented symbolically by a line 20. The intersection of the fringe intensity curves with the surface being measured shows that the phase of each correlogram changes at a different rate with respect to the position of the surface. As those skilled in the art will recognize, the combination of the three phases is unique within a certain range and can be used to calculate the exact distance of the test surface from the reference surface according to the principles of multiple-wavelength interferometry. It is noted that the three fringe patterns 12,14,16 could be produced by SCI with the same period of the spectral modulation as well as using different periods of modulation. Therefore, if the period of modulation is also varied while changing the mean wavelength, it must be done in a way that limits the change in the position of the peak so as to retain the ability to resolve the fringes.

Figure 3:
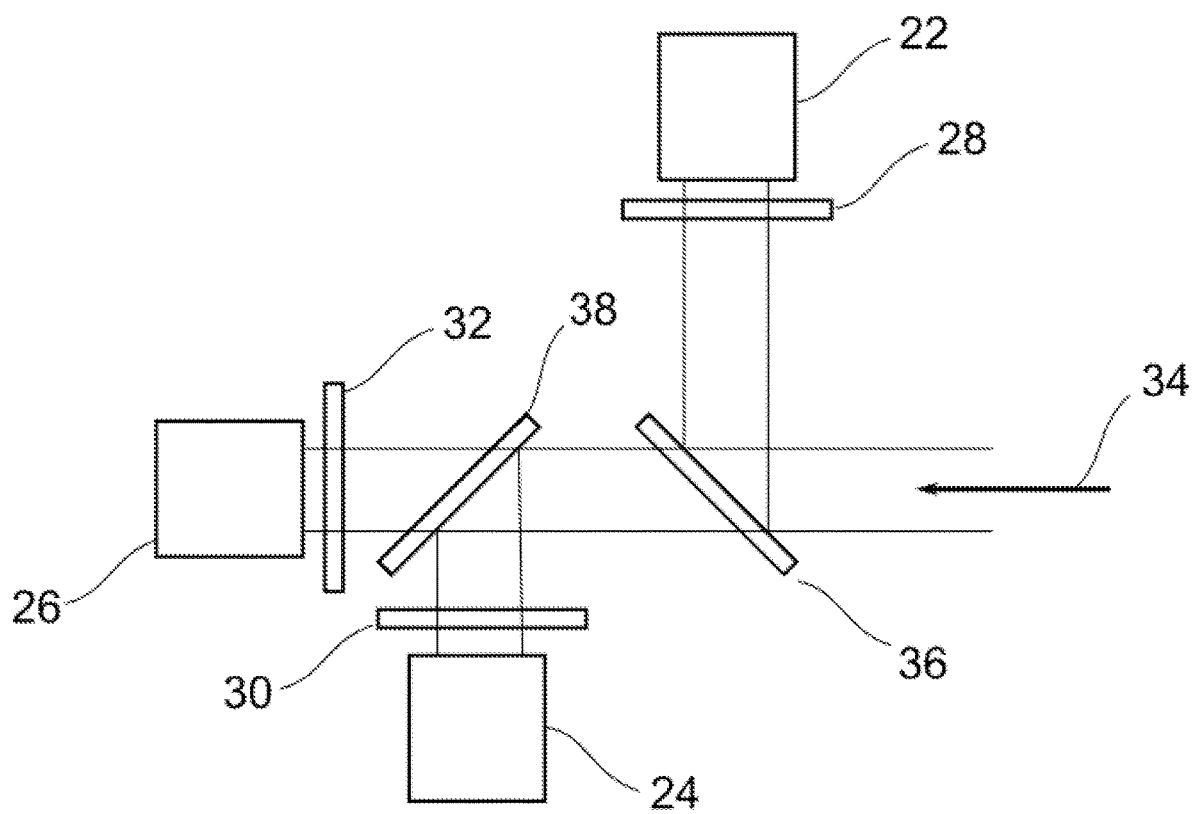
FIG. 3 shows a possible configuration for introducing mean-wavelength changes in the light source of an SCI instrument.
Figure 4:
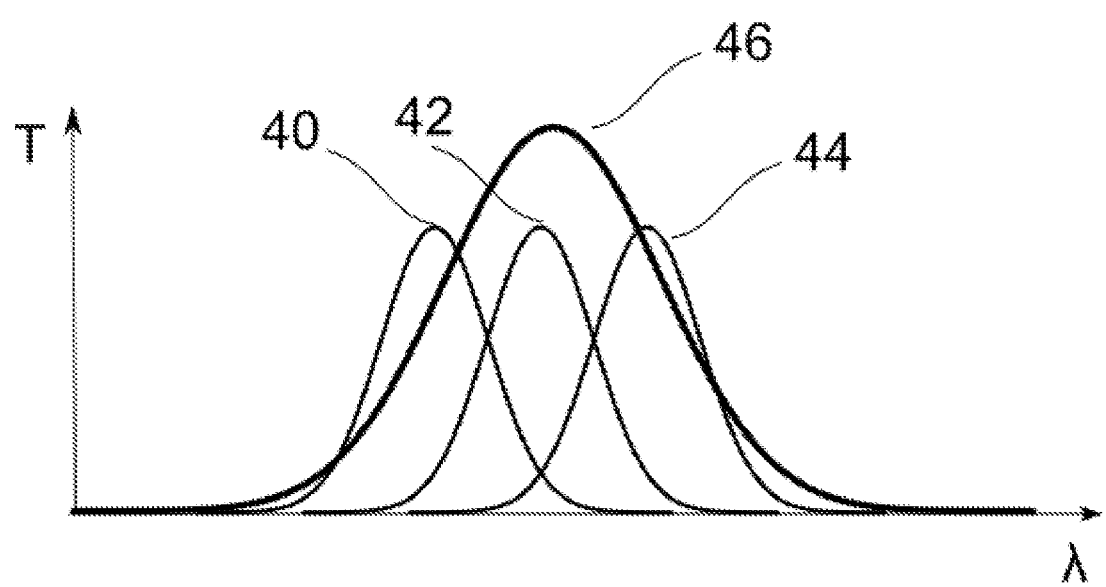
FIG. 4 illustrates the transmission curves T produced by three wavelength filters used in the set-up of FIG. 3 to form three localized wavelength-dependent correlograms.

SCI's typical use of a broad bandwidth source also affords a convenient way to build independent detection channels, each with a different mean wavelength. For example, as illustrated in FIG. 3, instead of the single camera used in conventional interferometers to register a series of images, a set of three cameras 22,24,26 (or more) can be used where each camera is equipped with a different filter in front of it (shown as elements 28,30,32, respectively). The spectrally modulated and interfered incoming beam 34 is divided into three beams by two beam splitters 36 and 38 directed toward respective camera/filter combinations. The filters are selected to let only a part of the entire source spectrum through such that each camera sees the resulting spectrum with a different mean wavelength. An example of transmission curves from such filters is shown in FIG. 4, where the curves 40,42,44 correspond to the spectra transmitted by the three filters 28,30,32, respectively, and the curve 46 represents the overall spectrum of the source. By properly selecting the transmission curves T of these filters, it is possible to produce simultaneously three phase-shifted fringe patterns with the properties described above. It is important to note that the cameras 22,24,26 can be replaced by single point detectors, line cameras, etc., to match particular measurement needs. Therefore, the method of the invention is not restricted to applications for imaging interferometers.

As a further advantage of SCI used with mean-wavelength control, as a result of splitting the source's light as taught above, it is possible to practice instantaneous phase-shifting interferometry. Conventional methods rely on the acquisition of a sequence of images with fringes shifted in phase by a predetermined amount. Such temporal phase shifting is susceptible to errors due to vibrations and other environmental disturbances that require specialized equipment to stabilize the measurement environment, which can be costly and may not be very effective. In contrast, instantaneous phase-shifting instruments acquire all the required information to determine the distribution of phase in the images in a single exposure. This makes them more immune to environmental influences. Such methods typically rely on the manipulation of the polarization of the beam to acquire several phase-shifted images simultaneously, but some measurement setups are sensitive to polarization.

The simultaneous use of three or more spectral bands, such as illustrated above as an aspect of the invention, creates conditions whereby not only it is possible to determine the position of the object with respect to the reference surface by analyzing the periods of the phase-shifted fringes produced by the three different mean wavelengths, but it is also possible to reconstruct the surface shape in the same way as done in instantaneous phase-shifting interferometry. Because the relative phases of the fringes in each channel depend on the object distance to the reference surface, the mean wavelength and the spectral modulation, each parameter can be exploited to produce phase-shifted fringes instantaneously. Thus, using an SCI interferometer with a set-up as illustrated in FIG. 3, where the three acquisition channels have been configured properly to introduce the required phase shifts between channels, three instantaneous phase-shifted fringes can be produced that are suitable for analysis by conventional methods to measure the surface of the test object. As well understood in the art, the phases of the fringes in the three channels would preferably by shifted uniformly to cover the range of 360 degrees so as to meet the requirements of interferometric analysis algorithms. It is expected that the object distance to the reference surface and the spectral modulation, as well as the mean wavelengths used to practice the invention, would require optimization to achieve good quality measurement, but the applicability of the invention to instantaneous phase-shifting interferometry has been shown.

Another approach to instantaneous phase-shifting interferometry according to the invention is afforded by the time-multiplexed SCI principles taught in U.S. Pat. No. 9,696,211, hereby incorporated by reference. According to time-multiplexed SCI, the tunable light source is spectrally controlled to produce multiple wavelengths during sequential fractions of the integration time of the detector of the interferometer and the captured wavelengths are selected so as to produce a visible correlogram at each integration time. Applying the same principle to the present invention, a three-channel configuration similar to FIG. 3, but with the white-light source replaced by a light source capable of emitting a varying wavelength and without thus unnecessary filters, can be used in time multiplexed fashion by triggering the three cameras 22,24,26 with a slight delay between cameras, such that they capture different portions of the scanned spectrum. During the exposure time (which typically would be the same for all three), each camera will capture slightly different portions of the scanned spectrum and, depending on the delay between them, this will result in different mean wavelengths in the accumulated spectrum producing the captured fringes. This time-multiplexed approach to mean-wavelength-shifting SCI also affords the advantage that the camera exposure delay required to provide desired phase shifts (e.g., 90 degrees apart) can be set electronically based on knowledge about the location of the test object. It should be noted that, instead of using the three-camera configuration with no filters described above, the same result can be obtained by using the spectrally-controllable source and the single-camera layout described in U.S. Pat. No. 9,696,211. Instead of having three cameras triggered at different times to capture the signals required to produce the three multiplexed correlograms produced by different mean wavelengths as described above, the single camera can be triggered at the same different times to produce the same time-multiplexed results.

A further extension of the instantaneous measurement option provided by the invention, whether practiced in simultaneous or time-multiplexed mode, lies in its use for coherence scanning interferometry where either the period or the phase of modulation of the spectrum of the source is varied sequentially in time so as to form sets of fringes at different distances away from the reference surface. By using several independent channels with different mean wavelengths, as taught herein, instantaneous phase-shifting methods of analysis can be applied at each scanning step to facilitate data processing and increase scanning speed. As mentioned above, the interferometer configuration does need to be limited to three cameras, three being only the minimum number required to calculate the object's phase. Introducing more detectors may provide additional benefits, such as improvements to the accuracy or the range of measurements.

Figure 5:
FIG. 5 is a flow-chart of the essential steps required for practicing the invention.
Figure 5:

Thus, a general method has been disclosed for shifting the phase of localized fringes produced by spectrally-controlled interferometry based on changes introduced in the mean wavelength of the spectrally-controlled source. The method can be used to determine the location of the test object along the optical axis of the interferometer and/or to instantaneously measure the phase of fringes. All these solutions allow substantial improvements to the capability of metrology instrumentation currently on the market. FIG. 5 is a flow-chart outline of the critical steps involved in practicing the invention. Practical solutions will most likely be more complex and optimized to fit particular problems, but the examples provided herein provide a sufficient basis for enabling those skilled in the art to understand and build upon the key aspects of the invention.

The invention has been shown and described herein in what is believed to be the most practical and preferred embodiments, but it is recognized that departures can be made therefrom. For example, mean-wavelength control has been shown primarily for the formation of phase-shifted correlograms, but it is understood that it could be used also for the formation of correlograms shifted in space. Therefore, the invention is not to be limited to the disclosed details but is to be accorded the full scope of the claims to embrace any and all equivalent apparatus and methods.

The invention claimed is:

1. A spectrally-controlled interferometric method for measuring a test surface, the method comprising the following steps:

providing an interferometer with a broadband light source configured to perform spectral modulation according to spectrally-controlled interferometric principles;

spectrally modulating the light source according to said spectrally-controlled interferometric principles so as to produce a localized correlogram at a test surface position;

changing a mean wavelength of the light source to produce multiple phase-shifted correlograms; and processing said multiple phase-shifted correlograms to determine a physical attribute of the test surface.

2. The method of claim 1, wherein said modulating step is carried out by sinusoidal spectral modulation of the light source.

3. The method of claim 1, wherein said light source is adapted to produce multiple beams having different mean wavelengths to produce corresponding multiple localized correlograms at said test surface position, and said processing step is carried out by applying multiple-wavelength interferometric analysis to multiple phase-shifted correlograms corresponding to said multiple localized correlograms.

4. The method of claim 3, wherein said modulating step is carried out by sinusoidal spectral modulation of the light source.

5. The method of claim 3, wherein said multiple localized correlograms are produced simultaneously, and said processing step is carried out by applying instantaneous phase-shifting interferometric analysis.

6. The method of claim 5, wherein said multiple beams are obtained by splitting the light beam produced by the source into at least three simultaneous beams having different mean wavelengths, thereby producing at least three simultaneous localized correlograms.

7. The method of claim 6, wherein said modulating step is carried out by sinusoidal spectral modulation of the light source.

8. The method of claim 6, further including the step of repeating the step of producing at least three simultaneous localized correlograms at different distances from said test surface position, processing said simultaneous localized correlograms obtained at each step with instantaneous phase-shifting interferometric analysis, and processing localized correlograms obtained from said different distances from the test surface using coherence scanning interferometric analysis.

9. The method of claim 8, wherein said modulating step is carried out by sinusoidal spectral modulation of the light source.

10. The method of claim 8, wherein a period of modulation of the light source is changed between each step of producing said at least three simultaneous localized correlograms at different distances from said test surface position.

11. The method of claim 1, wherein said step of changing a mean wavelength of the light source to produce multiple phase-shifted correlograms is achieved by the steps of:
splitting a light beam produced by the light source into at least three beams; and
conditioning said at least three beams so as to produce corresponding simultaneous beams with different mean wavelengths detected as said multiple phase-shifted correlograms.

12. The method of claim 11, wherein said modulating step is carried out by sinusoidal spectral modulation of the light source.

13. The method of claim 11, further including the steps of sequentially exposing the light detector elements to said simultaneous beams with different mean wavelengths so as to obtain multiple sets of said multiple phase-shifted correlograms at different distances from the test surface position, processing each of said multiple sets of said multiple phase-shifted correlograms obtained at each of said distances from the test surface position with instantaneous phase-shifting interferometric analysis, and processing correlograms obtained from said different distances from the test surface using coherence scanning interferometric analysis.

14. The method of claim 13, wherein said modulating step is carried out by sinusoidal spectral modulation of the light source.

15. The method of claim 13, wherein a period of modulation of the light source is changed between each step of sequentially exposing the light detector elements to said simultaneous beams with different mean wavelengths so as to obtain said multiple sets of said multiple phase-shifted correlograms at different distances from the test surface position.

16. The method of claim 1, wherein said modulating step of changing a mean wavelength of the light source to produce multiple phase-shifted correlograms is achieved by the steps of:
spectrally modulating the light source so as to emit a beam with a varying wavelength to produce varying interference-fringe signals at said test surface position, said signals being directed to a light detector module; and
exposing the light detector module to said varying interference-fringe signals to obtain multiple multiplexed correlograms produced by respective different mean wavelengths captured by the detector module during respective integration times.

17. The method of claim 16, wherein said modulating step is carried out by sinusoidal spectral modulation of the light source.

18. The method of claim 16, further including the step of repeating the step of sequentially exposing the light detector to said varying interference-fringe signals to obtain said multiple multiplexed correlograms at different distances from the test surface position, processing said multiple multiplexed correlograms obtained at each step with instantaneous phase-shifting interferometric analysis, and processing correlograms obtained from said different distances from the test surface using coherence scanning interferometric analysis.

\* \* \* \* \*